United States Patent
Delboulbe et al.

(10) Patent No.: US 6,246,521 B1
(45) Date of Patent: Jun. 12, 2001

(54) COMPACT LIGHTING DEVICE

(75) Inventors: Anne Delboulbe, Bagneux; Jean-Pierre Huignard; Cécile Joubert, both of Paris; Brigitte Loiseaux, Bures sur Yvette, all of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/284,965

(22) PCT Filed: Nov. 5, 1997

(86) PCT No.: PCT/FR97/01981

§ 371 Date: May 5, 1999

§ 102(e) Date: May 5, 1999

(87) PCT Pub. No.: WO98/20384

PCT Pub. Date: May 14, 1998

(30) Foreign Application Priority Data

Nov. 5, 1996 (FR) .................................................. 96 13455

(51) Int. Cl.$^7$ .................................................. G02B 27/44

(52) U.S. Cl. ....................... 359/563; 359/567; 359/571; 349/95

(58) Field of Search ........................... 359/563, 567, 359/571; 349/95

(56) References Cited

U.S. PATENT DOCUMENTS

| | | |
|---|---|---|
| 3,860,917 | 1/1975 | Auria et al. . |
| 3,874,785 | 4/1975 | Huignard . |
| 3,936,139 | 2/1976 | Huignard et al. . |
| 3,941,450 | 3/1976 | Spitz et al. . |
| 3,947,189 | 3/1976 | Huignard . |
| 3,961,837 | 6/1976 | Bied-Charreton et al. . |
| 3,980,389 | 9/1976 | Huignard et al. . |
| 4,001,635 | 1/1977 | D'Auria et al. . |
| 4,024,513 | 5/1977 | Huignard et al. . |
| 4,052,706 | 10/1977 | Spitz et al. . |
| 4,055,838 | 10/1977 | Huignard et al. . |
| 4,063,795 | 12/1977 | Huignard et al. . |
| 4,124,268 | 11/1978 | Micheron et al. . |
| 4,124,273 | 11/1978 | Huignard et al. . |
| 4,138,189 | 2/1979 | Huignard et al. . |
| 4,199,783 | 4/1980 | Huignard et al. . |
| 4,229,071 | 10/1980 | D'Auria et al. . |
| 4,268,838 | 5/1981 | Nakano et al. . |
| 4,284,324 | 8/1981 | Huignard et al. . |
| 4,304,458 | 12/1981 | Huignard et al. . |
| 4,306,763 | 12/1981 | Huignard . |
| 4,320,475 | 3/1982 | Leclerc et al. . |
| 4,353,616 | 10/1982 | Leclerc et al. . |
| 4,368,386 | 1/1983 | Huignard et al. . |
| 4,383,734 | 5/1983 | Huignard et al. . |
| 4,403,345 | 9/1983 | Granek et al. . |
| 4,403,352 | 9/1983 | Huignard et al. . |
| 4,413,885 | 11/1983 | Hareng et al. . |
| 4,442,455 | 4/1984 | Huignard et al. . |
| 4,449,785 | 5/1984 | Huignard et al. . |
| 4,451,151 | 5/1984 | Huignard . |
| 4,451,412 | 5/1984 | Loiseaux et al. . |
| 4,456,327 | 6/1984 | Huignard et al. . |
| 4,458,981 | 7/1984 | Huignard . |
| 4,483,592 | 11/1984 | Auborg et al. . |
| 4,491,867 | 1/1985 | Huignard . |
| 4,492,468 | 1/1985 | Huignard et al. . |

(List continued on next page.)

Primary Examiner—Cassandra Spyrou
Assistant Examiner—Fayez Assaf
(74) Attorney, Agent, or Firm—Oblon, Spivak, McClelland, Maier & Neustadt, P.C.

(57) ABSTRACT

A compact illumination device intended especially for illuminating an active matrix in a monochromatic or trichromatic display device. This device includes a source and collimating device in order to deliver a lighting direction from the source along a direction (Dy) and two optical components ($M_1$) and ($M_2$) which anamorphose the lighting in a direction parallel to the direction (Dy) and in a direction (Dz) perpendicular to the direction (Dy), respectively. These components may typically be of the holographic grating type operating in transmission or in reflection.

20 Claims, 7 Drawing Sheets

U.S. PATENT DOCUMENTS

| | | |
|---|---|---|
| 4,505,536 | 3/1985 | Huignard et al. . |
| 4,514,038 | 4/1985 | Pichon et al. . |
| 4,520,484 | 5/1985 | Huignard et al. . |
| 4,527,132 | 7/1985 | Huignard . |
| 4,543,662 | 9/1985 | Huignard . |
| 4,571,080 | 2/1986 | Papuchon et al. . |
| 4,576,434 | 3/1986 | Huignard et al. . |
| 4,586,779 | 5/1986 | Huignard et al. . |
| 4,591,241 | 5/1986 | Huignard . |
| 4,592,618 | 6/1986 | Huignard et al. . |
| 4,639,091 | 1/1987 | Huignard et al. . |
| 4,659,223 | 4/1987 | Huignard et al. . |
| 4,720,634 | 1/1988 | D'Auria et al. . |
| 4,818,052 | 4/1989 | Le Pesant et al. . |
| 4,836,629 | 6/1989 | Huignard et al. . |
| 4,847,521 | 7/1989 | Huignard et al. . |
| 4,864,312 | 9/1989 | Huignard et al. . |
| 4,877,312 | 10/1989 | Huignard et al. . |
| 4,917,450 | 4/1990 | Pocholle et al. . |
| 5,034,627 | 7/1991 | Ayral et al. . |
| 5,045,719 | 9/1991 | Ayral et al. . |
| 5,050,175 | 9/1991 | Ayral et al. . |
| 5,072,135 | 12/1991 | Huignard et al. . |
| 5,075,573 | 12/1991 | Huignard et al. . |
| 5,097,478 | 3/1992 | Verdiell et al. . |
| 5,121,400 | 6/1992 | Verdiell et al. . |
| 5,122,766 | 6/1992 | Huignard et al. . |
| 5,123,025 | 6/1992 | Papuchon et al. . |
| 5,150,241 | 9/1992 | Joffre et al. . |
| 5,181,054 | 1/1993 | Nicolas et al. . |
| 5,206,674 | 4/1993 | Puech et al. . |
| 5,222,093 | 6/1993 | Pocholle et al. . |
| 5,258,969 | 11/1993 | Refregier et al. . |
| 5,272,496 | 12/1993 | Nicolas et al. . |
| 5,272,551 | 12/1993 | Lehureau et al. . |
| 5,298,740 | 3/1994 | Ayral et al. . |
| 5,299,036 | 3/1994 | Nicolas et al. . |
| 5,300,942 * | 4/1994 | Dolgoff .................................. 342/32 |
| 5,307,306 | 4/1994 | Tournois et al. . |
| 5,317,651 | 5/1994 | Refregier et al. . |
| 5,323,372 | 6/1994 | Puech et al. . |
| 5,375,131 | 12/1994 | Pocholle et al. . |
| 5,394,412 | 2/1995 | Huignard et al. . |
| 5,402,261 | 3/1995 | Huignard et al. . |
| 5,410,421 | 4/1995 | Huignard et al. . |
| 5,416,617 | 5/1995 | Loiseaux et al. . |
| 5,428,697 | 6/1995 | Dolfi et al. . |
| 5,430,454 | 7/1995 | Refregier et al. . |
| 5,467,206 | 11/1995 | Loiseaux et al. . |
| 5,475,525 | 12/1995 | Tournois et al. . |
| 5,526,063 | 6/1996 | Joubert et al. . |
| 5,535,041 | 7/1996 | Ayral et al. . |
| 5,546,200 | 8/1996 | Nicolas et al. . |
| 5,621,547 | 4/1997 | Loiseaux et al. . |
| 5,652,672 | 7/1997 | Huignard et al. . |
| 5,659,536 | 8/1997 | Maillot et al. . |
| 5,680,386 | 10/1997 | Le Carvennec et al. . |
| 5,734,447 | 3/1998 | Loiseaux et al. . |
| 5,784,181 | 7/1998 | Loiseaux et al. . |
| 5,801,794 | 9/1998 | Lehureau et al. . |
| 5,818,614 | 10/1998 | Nicolas et al. . |
| 5,844,233 * | 12/1998 | Sato .................................. 250/208.1 |

* cited by examiner

COMPACT LIGHTING DEVICE

BACKGROUND OF THE INVENTION

1. Field of the Invention

The field of the invention is that of illumination devices and more specifically that of trichromatic illumination devices suitable for illuminating an LCD screen.

2. Discussion of the Background

At the present time, many display applications require the use of compact and lightweight illumination devices, allowing both small screens and very large screens (having an area of greater than 1 square meter) to be illuminated.

For some applications, a major requirement is to optimize the compactness, light efficiency and contrast parameters, especially in applications such as ultralight imagers for avionic helmet displays or else for large wall-mounted flat television screens typically 5 cm in depth for an image of 1 meter in diagonal, operating in direct-view mode.

The current solutions for helmet imagers are in fact based on the use of monochromatic CRT mini tubes; however, an essential requirement in these applications is to display trichromatic images, as long as it is possible simultaneously to satisfy the compactness-weight and brightness criteria. With the present techniques, the use of an LCD screen has a certain advantage with regard to compactness-weight, nevertheless new lighting solutions have to be envisaged in order to provide sufficient luminance allowing the user to display an image with sufficient contrast (typically greater than 5), particularly when he is moving around in bright ambient light (a pilot on a daytime mission).

Figure 1:
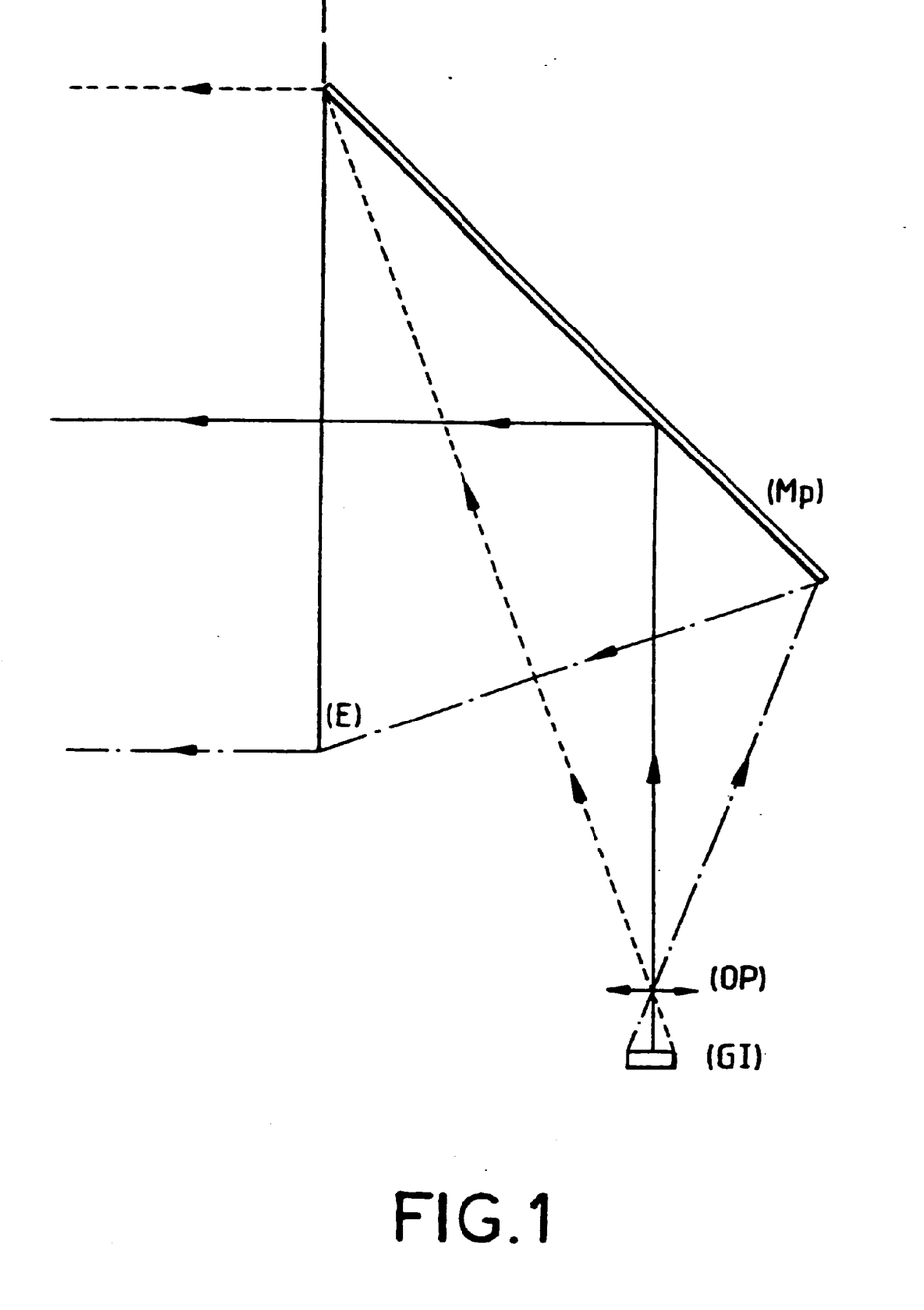
FIG. 1 illustrates an example of a display device comprising an illumination device according to the prior art.

Likewise, in large television screen applications, the LCD solutions currently employed are based on projection techniques which result in not insignificant depths, ranging from 20 to 40 cm, in the case of image formats of about 1 meter in diagonal. By way of example, FIG. 1 illustrates an example of a display device using an image generator GI comprising especially a source and an active matrix, a projection optic OP and a deflecting mirror Mp which deflects the image towards the screen capital E, the whole system constituting a bulky device. One alternative would consist in using LCD screens in direct-view mode, based on a specific technology compatible with video-rate addressing, it being more difficult to address large pixels because of the large capacitances inherent in large electrooptic pixels. Large screens have the advantage of being able to dispense with a projection optic, but at the present time backlighting devices based on fluorescent tubes developed for computer applications do not have the luminance and contrast characteristics required for displaying a satisfactory video image in the mass market.

SUMMARY OF THE INVENTION

To alleviate these various drawbacks, the subject of the invention is a compact illumination device using novel anamorphic means to adapt the extent of a source to the illumination of a screen format, compatible with a compact display structure whose depth is small compared with the cross section of the illumination.

More specifically, the subject of the invention is a compact illumination device, comprising at least one source and collimating means, in order to deliver a lighting direction from the source along a so-called vertical direction Dy, characterized in that it comprises:

an optical component which anamorphoses the lighting in a direction approximately parallel to the so-called vertical direction;

an optical component which anamorphoses the lighting in a so-called horizontal direction approximately perpendicular to the so-called vertical direction so as to adapt the extent of the source to the illumination of a given rectangular format.

According to a variant, the optical component $M_1$ is a reflective component inclined at an angle $\theta_1$ with respect to the direction Dy.

This optical component $M_1$ may advantageously be reflective and consist of microprisms, each making an angle of approximately 45 with the direction $D_y$. This optical component $M_1$ may also advantageously be a diffractive component consisting of index microstrata inclined at approximately 45° to the direction $D_y$. In the case of trichromatic illumination intended for the lighting of a colour screen, the component $M_1$ may advantageously comprise the superposition of three holographic gratings, which reflect red, green and blue, respectively; these three gratings may be recorded in a single layer or in several layers of photosensitive materials. In addition, the index microstrata may give the grating a colour-splitting function, by dint of the angular dispersion of the red, green and blue colours. In order to produce this function, the component $M_1$ may comprise the superposition of at least two holographic gratings, the strata of which have a spacing and an orientation (close to 45° with respect to $D_y$) which are matched to the dispersion in a given direction (close to the direction $D_x$) of the red, green and blue colours. This is because two gratings may suffice insofar as a first grating causes extensive dispersion in the red and little in the green and a second grating causes extensive dispersion in the blue and little in the green, while together they cause sufficient dispersion in the red, the green and the blue.

According to a variant of the invention, the optical component $M_2$ is a component operating in reflection, inclined at an angle $\theta_2$ with respect to the direction $D_x$ approximately perpendicular to the directions $D_y$ and $D_z$.

It may advantageously comprise microprisms, each making an angle of approximately 45° with the direction $D_x$ or comprise index microstrata inclined at approximately 45° to the direction $D_x$.

When the component $M_2$ is a component of the diffractive holographic grating type, it may diffract the red, green and blue colours, this being so whether it operates in reflection or in transmission. When the component $M_2$ operates in reflection, it may be analogous to the holographic component $M_1$ and consist of at least two holographic gratings of a given strata orientation and spacing in order to cause dispersion of the light in different directions and thus provide a chromatic dispersion function.

When the component $M_2$ operates in transmission, the dispersion function is much more pronounced than in reflection and a single holographic grating may be enough to provide the angular chromatic dispersion.

This is why the subject of the invention is also a compact illumination device in which the optical component $M_2$ is a diffractive component, operating in transmission, which can be inclined at an angle $\theta_2$ with respect to the direction $D_x$ or parallel to the direction $D_x$. The latter configuration may be particularly compact when the device is incorporated into a trichromatic display device and the component $M_2$ may consist of an array of holographic lenses juxtaposed on an active matrix. In this case, the component $M_2$ provides several functions:

anamorphosis in the direction $D_x$;

colour splitting;

focusing onto the pixels of the active matrix.

BRIEF DESCRIPTION OF THE DRAWINGS

The invention will be more clearly understood and further advantages will appear on reading the description which follows, given by way of non-limiting example, and by examining the appended figures in which.

DETAILED DESCRIPTION OF THE PREFERRED EMBODIMENTS

The compact illumination device according to the invention in general comprises:
- a light source which may be monochromatic or trichromatic;
- a light-collimating device;
- two optical components $M_1$ and $M_2$ which anamorphose the lighting coming from the source and from the collimating means, one in a vertical direction and the other in a horizontal direction.

Figure 2:
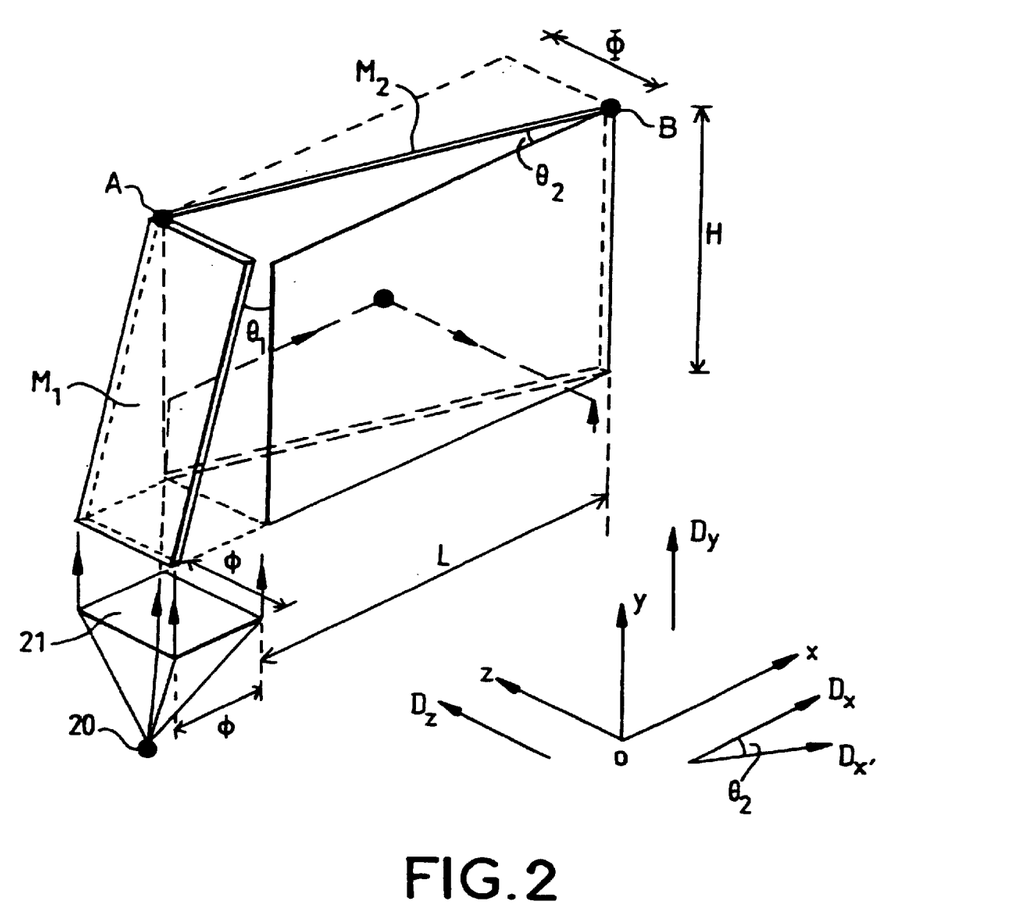
FIG. 2 illustrates a first example of an illumination device according to the invention.

FIG. 2 illustrates a first embodiment of the invention in which a source 20 delivers an incident beam which is collimated by a lens 21. The diameter $\phi$ of the lens is the determining factor with regard to the depth of the device, as shown in this figure. In this configuration, the optical component $M_1$ is reflective and has a structure allowing the beam to be spread spatially in only one direction, in this case in the vertical direction $D_y$.

The component $M_2$ intercepts the beam thus spread and reflects it in the direction $D_{z'}$ perpendicular to the image plane defined by the directions $D_x$ and $D_y$, the direction $D_{x'}$, making an angle $\theta_2$ with the direction $D_x$.

In order to intercept the entire collimated light flux, the component $M_1$ makes an angle $\theta_1$ with the direction $D_y$ or, more precisely, the plane of the component $M_1$ makes an angle $\theta_1$ with the plane defined by the directions $D_z$ and $D_y$.

Likewise, the plane of the optical component $M_2$ makes an angle $\theta_2$ with the plane defined by the directions $D_x$ and $D_y$ in order to intercept the light flux reflected by the optical component $M_1$.

As illustrated in FIG. 2, the dimensions of the lighting region or image plane of the source are defined by the parameters L and H. In the case of a pupil of cross section $\phi \times \phi$, $H = \phi \cot \theta_1$ and $L = \phi \cot \theta_2$.

Figure 3:
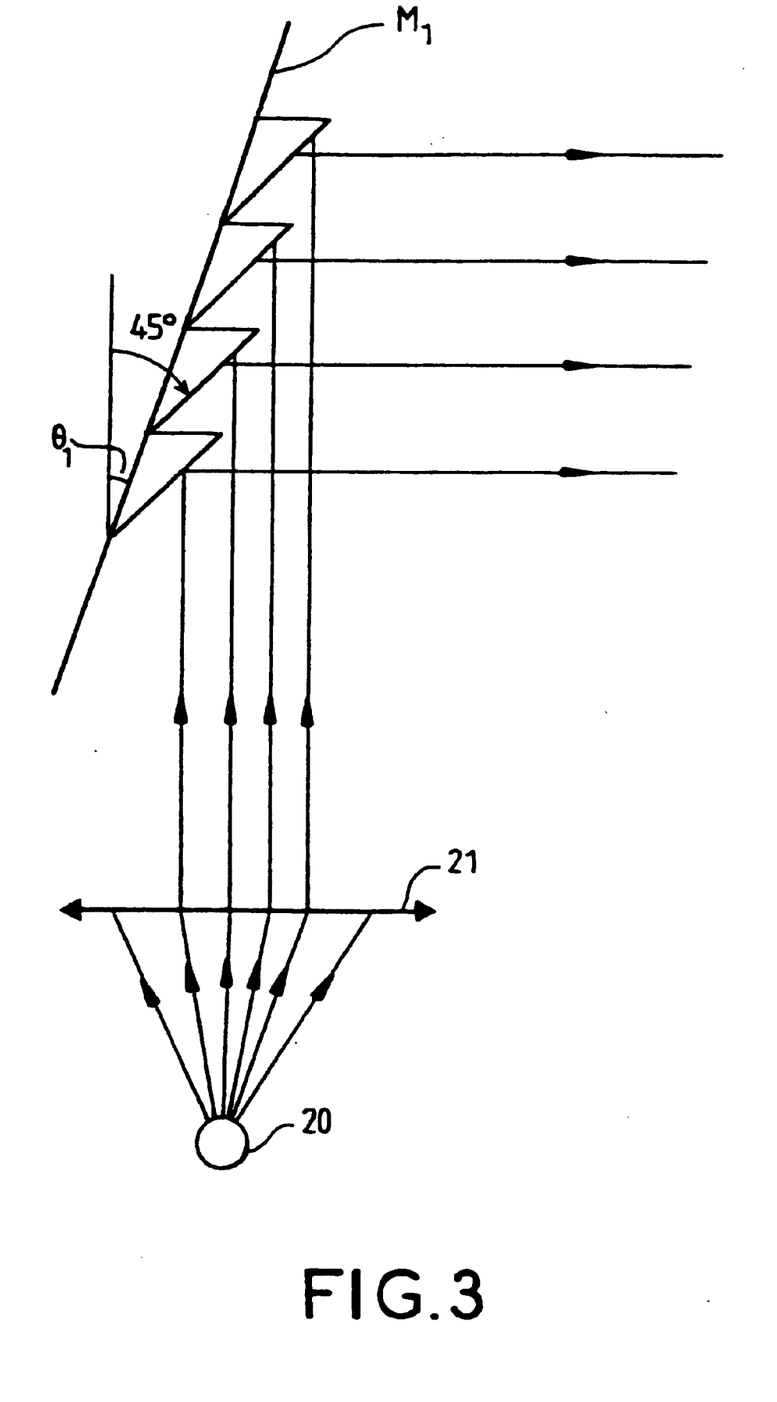
FIG. 3 illustrates a first example of an anamorphic component $M_1$ or $M_2$ which can be used in an illumination device according to the invention.

FIG. 3 shows diagrammatically a first example of an anamorphic reflective component. This is a non-diffractive anamorphic component consisting of microprisms positioned at 45° with respect to the beam incident at an angle of 45°, these microprisms being metallized in order to provide the reflection function.

Figure 4:
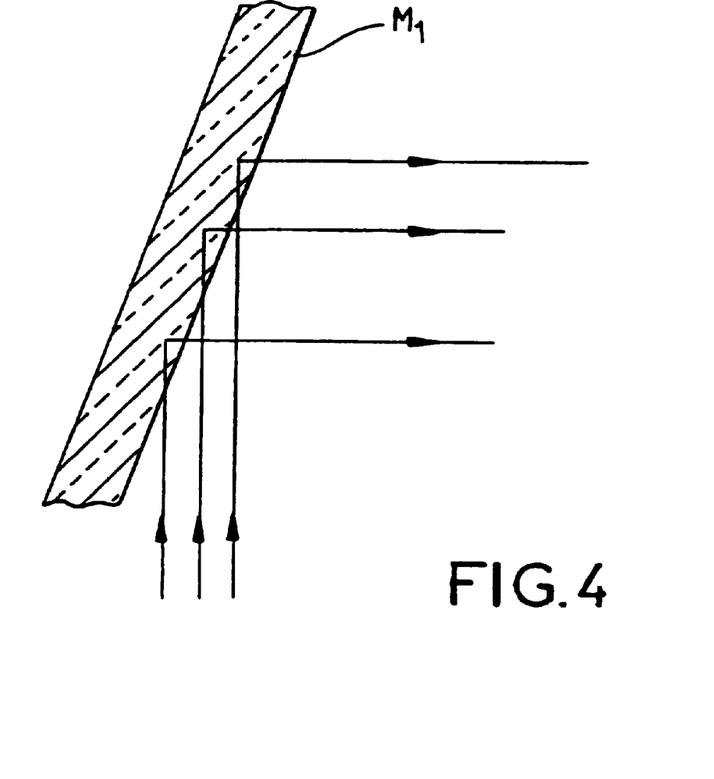
FIG. 4 illustrates a second example of an anamorphic component $M_1$ or $M_2$ of the holographic mirror type which can be used in an illumination device according to the invention.
Figure 5:
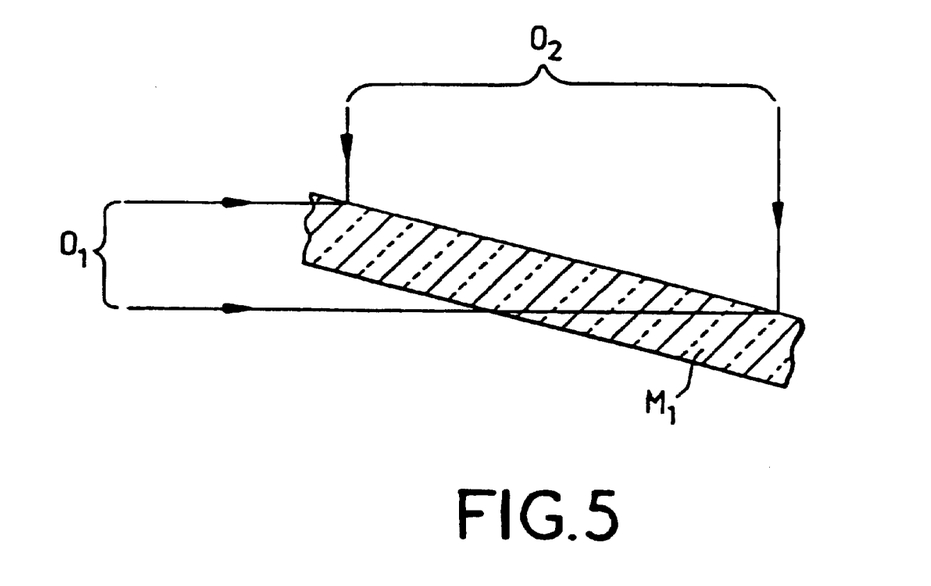
FIG. 5 illustrates the recording principle for the holographic mirror according to FIG. 4.

FIG. 4 shows diagrammatically a second example of an anamorphic component of the holographic mirror type. It consists of a grating recorded in a photosensitive material of the photopolymer type. The recording principle for the component is given in FIG. 5. This involves the interference of two plane waves $O_1$ and $O_2$ within the volume of the material of which the anamorphic component is composed, in order to produce index strata in the volume of the said material. After replay by a plane wave having a wavelength $\lambda_O$ within the operating spectral band, the grating thus produced causes the collimated beam to be spread out over the height H of the surface which it is desired to be lit, where $H = \phi \cot \theta_1$.

When trichromatic operation is envisaged, using the three, red, blue and green, primary mean wavelengths, the colour filters conventionally used may be replaced with the optical component $M_1$. More specifically, the component $M_1$ may be produced by recording the anamorphosis function in a film consisting of the superposition of three layers sensitized in the red, in the green and in the blue respectively, or by the superposition of three anamorphosis functions in a single film, each being matched to one spectral band.

Collimated lighting in the perpendicular direction $D_x$ is obtained by the second anamorphic component $M_2$, as indicated in FIG. 2. This component sends the incident rays in a direction $D_{z'}$ perpendicular to the plane defined by the directions $D_y$ and $D_{x'}$. In the case of an LCD-type screen, the lighting direction and the direction for best contrast of the LCD (corresponding to an angle of approximately 4 degrees with respect to the normal to the plane of the LCD) may be precisely adjusted.

Typically, the optical component $M_2$ may be one of those shown in FIGS. 3 and 4.

If $M_1$ does not provide the colour-splitting function, then the optical component $M_2$ may advantageously also provide an angular colour-splitting function, by angular dispersion of the spectral components. When the component $M_2$ operates in reflection, it comprises at least two holographic gratings, the index strata of which are judiciously oriented with respect to a 45° mean direction with respect to the direction $D_y$ in order to cause sufficient dispersion of the three, red, blue and green, spectral components. When the component $M_2$ operates in transmission, its dispersion effectiveness is higher and a single index grating is enough to produce the dispersion of the three colours, red, blue and green.

The use of an anamorphic component capable of providing a colour-splitting function obviates the use of colour filters generally used in display devices.

We will now describe examples of display devices for which the illumination device according to the invention is particularly beneficial.

Generally speaking, the compact collimated lighting described above may be intended, for example, for illuminating an active-matrix screen, which may be positioned directly after the illumination device.

However, LCD screens, of part the structure of the active matrix, has a small useful area. In order to improve the luminants of the LCD image, it is known to use a matrix of lenses which focuses the incident lighting onto the transparent region of the pixel. In order for these situations to be advantageous, they require the use of particularly collimated lighting in order for the image of the source, formed at the focus of each of the lenses and lying within the liquid-crystal layer, to be matched to the useful area of the pixel. The illumination device proposed in the invention is particularly advantageous for exploiting these techniques, especially in the case of applications using microlenses of standard characteristics (typically a focal length of a few millimeters and a pupil of about 100 μm) which allow the entire flux emitted by the source to be used.

Large-Size Video Application

The compact illumination device according to the invention may in this case have the following characteristics:
- a source of the short-arc lamp type, for example a metal-halide lamp of small geometrical extent, corresponding to an arc of approximately 1 mm;
- a lens for collimating the short-arc lamp, with a focal length f of 100 mm and a diameter φ of 50 mm;
- two anamorphic optical components $M_1$ and $M_2$ comprising holographic gratings recorded in a layer having a thickness of approximately 10 μm in a photosensitive material.

The illumination device delivers collimated lighting in the directions $D_x$ and $D_y$ over an area H×L, this being suitable, typically, for a screen size of 800×600 mm².

Figure 6:
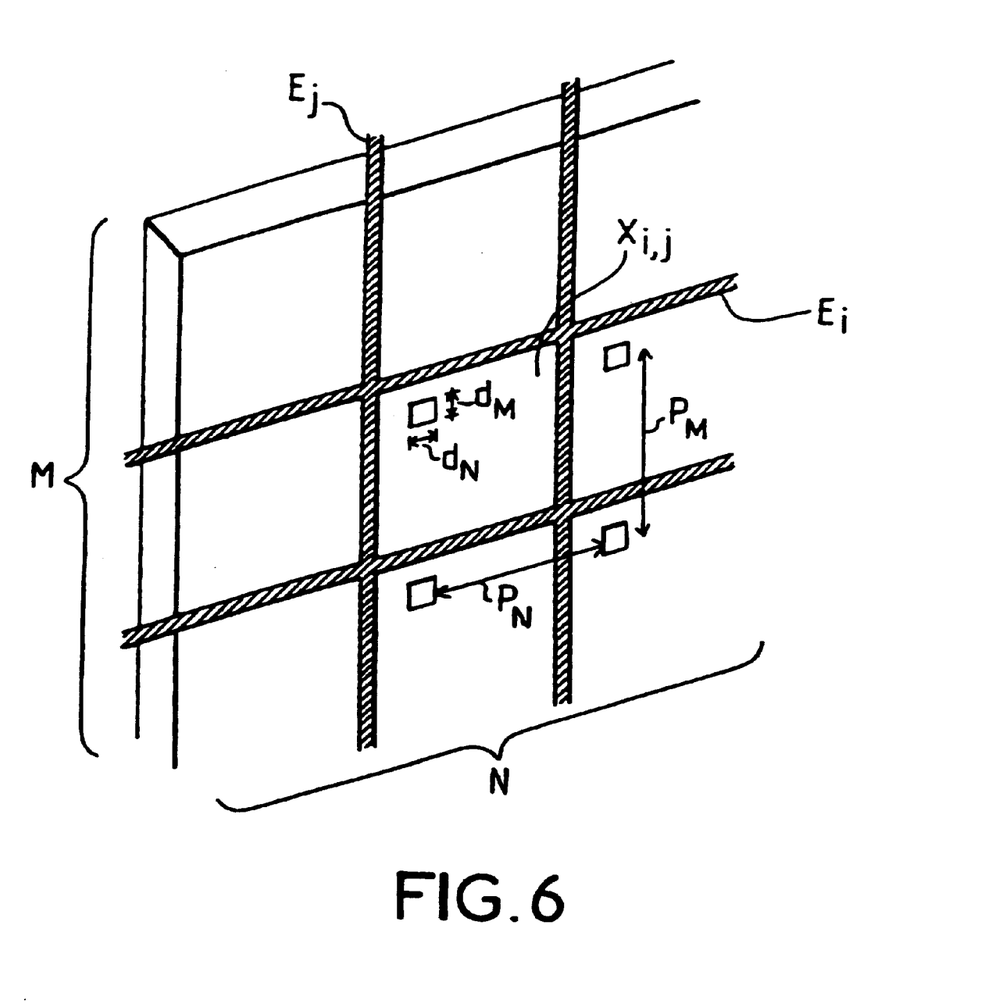
FIG. 6 illustrates an example of an active matrix which can be used in a display device comprising an illumination device according to the invention.

The dimensions H and L are defined by the parameters φ, the diameter of the collimating lens, and the angles $\theta_1$ and $\theta_2$, at which the components $M_1$ and $M_2$ are inclined. The large-sized liquid-crystal matrix may advantageously comprise small elementary pixels of dimensions close to 60 μm×60 μm, distributed with a spacing of about 1 mm, as illustrated in FIG. 6. With liquid-crystal pixels of small size (typically 60 μm×60 μm), the problems of addressing at a video rate (typically, it is desired at the present time to address all the points on one line, approximately 800 pts, in 60 μs) are obviated. In order to increase the effectiveness of the illumination, all that is required is to provide a microlens array $R_1$ placed between the illumination device and the active matrix in order to focus the collimated lighting onto each elementary pixel. The lens array may be attached to the rear face of the matrix or produced directly on the rear face, especially by moulding. The focal length of the lenses may be comparable to the thickness of the active matrix so as to have a very compact lens array $R_1$/active matrix assembly (typically, the focal length of the lenses may be about 6 mm and the spacing of the lenses about one millimeter).

Figure 7:
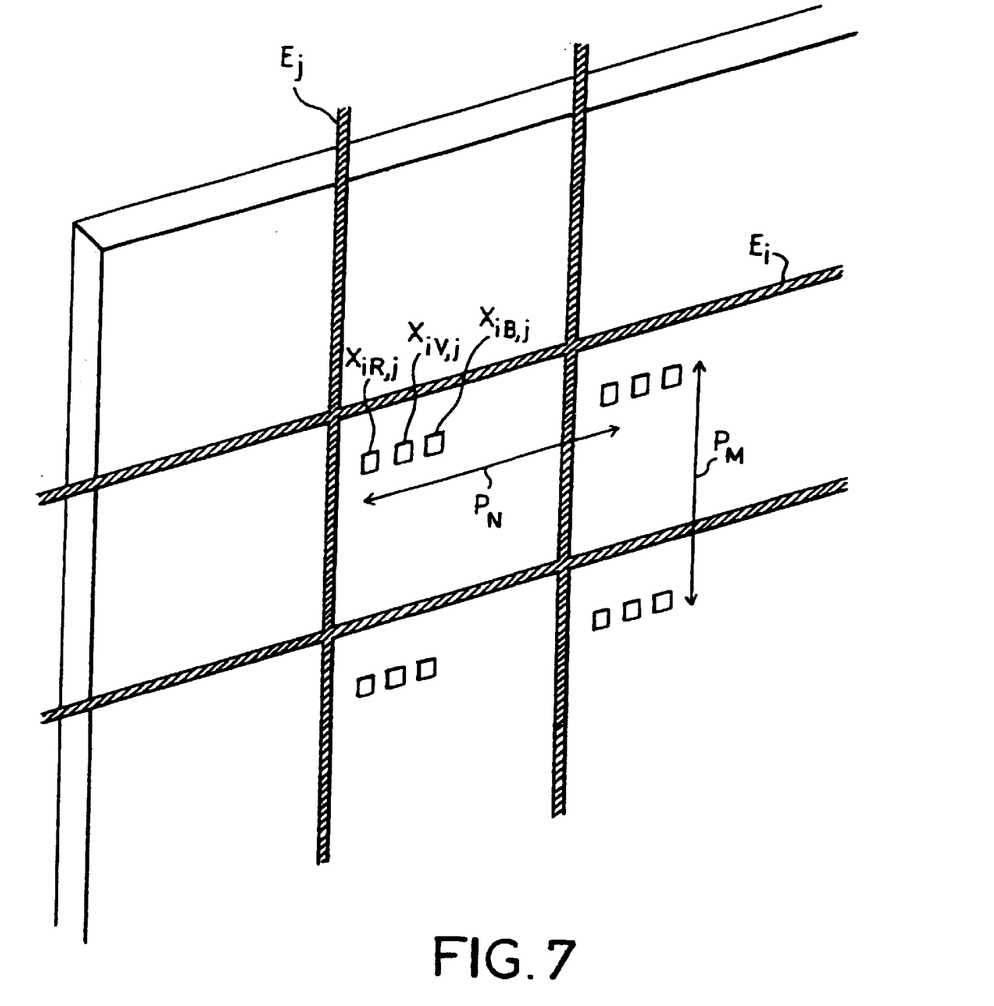
FIG. 7 illustrates an example of an active matrix which can be used in a trichromatic display device comprising an illumination device according to the invention.
Figure 8:
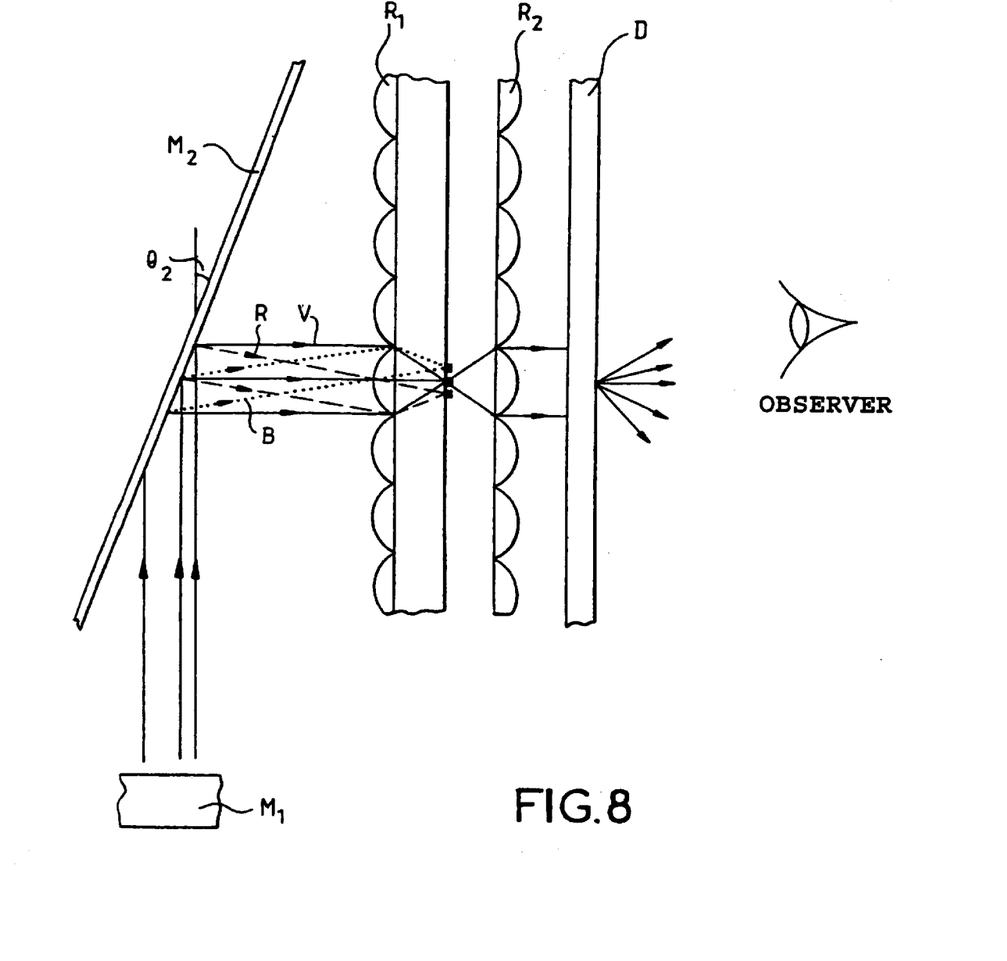
FIG. 8 illustrates an example of a display device using the illumination device according to the invention.

The active-matrix configuration adopted may, for example, be of the type shown in FIG. 7. In the case of a trichromatic display device, each white image point consists of a triad of red, blue and green elementary subpixels. In this type of trichromatic architecture, the spacing of the lens array is of the same order of magnitude as the spacing of the triads. FIG. 8 illustrates an example of a display device. On the exit side of the active matrix, a second microlens array $R_2$ generates a beam whose intensity has been modulated by each elementary pixel depending on the electrical signals applied. This collimated beam coming towards an observer may be scattered by a diffuser D so as to adapt the ray diagram of the display device.

In the embodiment described above, the lens array $R_1$ and the active matrix are placed in the plane defined by the directions ($D_{x'}$, $D_y$).

According to another embodiment of the invention, the display device may be made even more compact by positioning the optical component $M_2$ and the active matrix in the same plane defined by the directions $D_{x'}$ and $D_y$, the direction $D_{x'}$ making an angle $\theta_2$ with the direction $D_x$. In this configuration, the component $M_2$ is a diffractive component operating in transmission. The lens array $R_1$ may be incorporated into the component $M_2$, by producing an array of holographic lenses in transmission, these being recorded by causing a plane wave and a spherical wave to interfere with each other.

Helmet Display Application

This relates to a very light and very compact display device which can be incorporated into a helmet. To do this, the illumination device may comprise a solid-state laser source, the geometrical extent of which is very small (less than 1 mm² .sr), allowing the laser source to be focused onto very small pixels (approximately 20 μm×20 μm) using microlens arrays located on the back plate of the LCD matrix.

These conditions of use make it possible to produce displays with a very high resolution and, bearing in mind the small size of these devices, the power of the laser sources involved is low (about 10 mW).

What is claimed is:

1. A trichromatic illumination device for lighting a colour screen, comprising:
   at least one source;
   a collimating device configured to collimate light from said at least one source along a first direction;
   a first optical component configured to anamorphose said light in a direction approximately parallel to the first direction; and
   a second optical component configured to anamorphose light from said first optical component in a second direction approximately perpendicular to the first direction;
   wherein at least one of said first optical component and said second optical component is configured to color split light.

2. The device according to claim 1, wherein said first optical component is inclined at an angle with respect to the first direction.

3. The device according to claim 2, wherein the first optical component is reflective and comprises a plurality of microprisms, each microprism making an angle of approximately 45° with the first direction.

4. The device according to claim 3, wherein the second optical component is reflective and inclined at an angle with respect to the second direction.

5. The device according to claim 2, wherein the second optical component is reflective and inclined at an angle with respect to the second direction.

6. The device according to claim 2, wherein the second optical component is a diffractive component operating in transmission, parallel to the second direction.

7. The device according to claim 2, wherein the first optical component is reflective and comprises index microstrata inclined at approximately 45° with the first direction.

8. The device according to claim 7, wherein said first and second components comprise a superposition of three gratings, a first grating causing anamorphosis of red light, a second grating causing anamorphosis of green light and a third grating causing anamorphosis of blue light.

9. The device according to claim 7, wherein said first and second components comprise a superposition of at least two gratings comprising index microstrata inclined at different directions close to 45° so as to cause dispersion of red light, green light and blue light along three different directions.

10. The device according to claim 7, wherein the second optical component is reflective and inclined at an angle with respect to the direction.

11. The device according to claim 1, wherein the second optical component is reflective and inclined at an angle with respect to the second direction.

12. The device according to claim 11, wherein the second optical component comprises a plurality of microprisms, each microprism making an angle of approximately 45° with the second direction.

13. The device according to claim 11, wherein the second optical component comprises index microstrata inclined at approximately 45° to the second direction.

14. The device according to claim 13, wherein the first and second optical components comprise a superposition of three gratings, a first grating causing anamorphosis of red light, a second grating causing anamorphosis of green light and a third grating causing anamorphosis of blue light.

15. The device according to claim 13, wherein the first and second optical components comprise a superposition of at least two gratings comprising index microstrata inclined at different directions close to 45° so as to cause dispersion red light, green light and blue light along three different directions.

16. The device according to claim 1, wherein the second optical component is a diffractive component operating in transmission, parallel to the second direction.

17. The device according to claim 16, wherein the second optical component comprises a grating of index microstrata, capable of causing dispersion of red light, green light, and blue light along three different directions.

18. The device according to claim 16, wherein the second component comprises an array of holographic lenses.

19. The device according to claim 18, wherein said second optical component is superimposed on the spatial light modulator.

20. The device according to claim 1, further comprising a spatial light modulator illuminated by said light anamorphosed by said first and second optical components.

* * * * *